UNITED STATES PATENT OFFICE 2,656,395

PREPARATION OF NITROOLEFINS

Richard Edward Benson, Claymont, Del., assignor to E. I. du Pont de Nemours and Company, Wilmington, Del., a corporation of Delaware No Drawing. Application June 8, 1951,
Serial No. 230,680

7 Claims. (Cl. 260—644)

This invention relates to nitroolefins and to methods for their preparation.

Nitroolefins are an important class of chemical intermediates for conversion to amines, aminoalcohols, ethers, thioethers, etc. In one method hitherto used for preparing nitroolefins, an olefin and nitric oxide have been reacted at essentially room temperature and atmospheric pressure in the presence of ultraviolet light to initiate the reaction (J. Chem. Soc. 1944, 120). The reaction is not clean cut and the yields of desired nitroolefin are poor. Elod and Nedelman, C. A. 21, 3254 (1927) reacted nitric oxide with ethylene at 900° C. and obtained hydrogen cyanide along with a heavy carbon deposit and a large amount of polymeric substances. Their results indicated that formation of carbon and polymers might be avoided by using lower temperature but this resulted in a lowered yield of hydrogen cyanide.

An object of the present invention is an improved method for the preparation of nitroolefins. A further object is such a method characterized by substantial yields and increased efficiency. Other objects will be understood from the following detailed description of the invention.

The present invention is a process for the preparation of a nitroolefin which comprises reacting with nitric oxide an olefin containing more than two carbon atoms, said reaction being conducted in an acidic medium in the absence of air at temperatures of 80 to 150° C. and under pressure of 50 to 400 pounds per square inch.

In one preferred aspect for operating the process of this invention, a pressure reactor is charged with a solution of the olefin in anhydrous acetic acid, the reactor is purged with oxygen-free nitrogen, and then the latter is removed by vacuum means. The reactor is then pressured with nitric oxide to a predetermined desired pressure, and the pressure maintained by periodic injections of nitric oxide. These conditions are maintained until the pressure drop in five minutes is less than 20 pounds per square inch. The contents are then heated to between 80° and 150° C. for one to four hours. Thereafter, the reaction mixture is permitted to cool to room temperature and the reactor discharged. The product is then distilled under reduced pressure to recover the desired nitroolefin.

The examples which follow are submitted to illustrate and not to limit the invention.

Example I

A solution of 40.5 g. of cyclohexene in 100 cc. of acetic anhydride was placed in a pressure vessel, the vessel purged with oxygen-free nitrogen and then evacuated briefly. The reactor was then pressured to 200 pounds per square inch with nitric oxide and this pressure maintained until the pressure drop in 5 minutes was less than 20 pounds per square inch. The contents of the reactor were heated to 100° C. for 2 hours, the reaction mixture allowed to cool, and the gases vented.

The above cycle was repeated twice, the product removed from the pressure vessel and distilled through a 4″ Vigreux column. The fractions collected were as follows:

| Fraction | B. P., °C. | Pressure, mm. | Amount | Remarks |
|---|---|---|---|---|
| 1 | 25–50 | 15–16 | 90 cc. | Mainly acetic anhydride. |
| 2 | 25–58 | 2 | 15.3 g. | Yellow oil. |
| 3 | Residue | | 27.0 g. | Viscous, dark, liquid. |

Fraction 2 was combined with the similar fraction from another run and the combined material redistilled through a 4″ Vigreux column. The fractions collected were as follows:

| Fraction | B. P., °C. | Pressure, mm. | Weight, Grams | Remarks |
|---|---|---|---|---|
| 1 | 50–59 | 2.1–2.3 | 0.8 | |
| 2 | 59–62 | 2.5–3.5 | 3.9 | |
| 3 | 65–73 | 3.5–4.0 | 1.4 | |
| 4 | 73–74 | 3.5–4.0 | 14.6 | $n_D^{21}$ 1.4919 |
| 5 | 74–75 | 4.0 | 1.8 | |

Fraction 4 analyzes 56.82, 56.87% carbon, 7.46, 7.41% hydrogen, and 10.40, 10.58% nitrogen. The calculated values for $C_6H_9NO_2$ are 56.68% carbon, 7.14% hydrogen, and 11.02% nitrogen. The product was a light yellow liquid which was insoluble in 2% aqueous sodium hydroxide. When the product was mixed with alcoholic hydrogen chloride, a blue color developed, which was indicative of the presence of a 1-nitro group. The ultraviolet spectrum of this product was similar to that reported for 1-nitrocyclohexene.

Example II

Example I was repeated with a charge consisting of 30 cc. of cyclohexene and 100 cc. of acetic acid. The charge was heated at 100° C. with nitric oxide for 5 hours, during which time the pressure was maintained at 100 pounds per square inch. During this time there was an observed pressure drop corresponding to 0.4 mole nitric oxide. The reactor was allowed to cool, vented, and the contents discharged. The reaction product was distilled through a 4″ Vigreux column. There were collected 4.2 grams of yellow oil, B. P. 50–63/0.4–0.8 mm. characterized by development of blue color upon addition of alcoholic hydrogen chloride as 1-nitrocyclohexene.

Example III

A pressure reactor was charged with 25 cc. of styrene in 100 cc. of acetic anhydride. The reactor was flushed with oxygen-free nitrogen and then evacuated. Nitric oxide was then admitted into the reactor to a pressure of 50 pounds per square inch and the mixture heated to 100° C. These conditions were maintained for 6.5 hours, during which time the pressure was maintained at the indicated level by periodic repressuring with nitric oxide. During this reaction period a pressure drop corresponded to 0.95 mole nitric oxide was noted. The reactor was allowed to cool, vented, and the contents discharged. The product was a red liquid containing some solid and it weighed 123 grams. Distillation through a 4" Vigreux column yielded 8.7 grams of a product, B. P. 101–111° C./1.0–1.5 mm., identified as omega-nitrostyrene. The yield was 27%.

The examples have illustrated certain preferred embodiments. It is to be understood that departure may be had from these without digressing from the scope and spirit of this invention.

The nitrosation of the olefins with nitric oxide may be carried out at temperatures in the range of 80 to 150° C. Best results, however, are realized within the more restricted range of 90 to 125° C. and this embraces the temperature conditions which are generally used.

In practice it is convenient to charge the reactor with the olefin and an acidic solvent and then to inject nitric oxide to a predetermined pressure. The reaction mixture is then heated to the temperature selected for reaction and the pressure within the system maintained by periodic injections of nitric oxide. As a rule, the pressures used will range from 50 to 400 pounds per square inch. If desired, however, the process can be carried out at atmospheric pressure but the yield of desired nitroolefins is markedly decreased.

The nitrosation reaction of this invention is carried out in an acidic medium and this is critical for operability. Thus, if the process of Example II is repeated using chloroform or benzene as the medium in place of acetic acid, little or no reaction occurs. Likewise, replacing the acetic anhydride in the process of Examples I or III with chloroform, benzene, or other nonacidic reaction medium results in little or no reaction occurring.

Acetic acid and acetic anhydride are the preferred reaction media because they are abundantly available, relatively low in cost, easily removed from the reaction product, and have general good solvency characteristics. In place of acetic acid or anhydride, other saturated aliphatic carboxylic acids and anhydrides may be used. Examples are propionic, butyric, etc., acids and anhydrides.

The amount of reaction medium used is not critical and it can be varied over wide limits. For practical reasons, an amount is used to give solutions varying in concentration from 20 to 60% by volume. Deviation can be had from these limits though without serious sacrifice in the efficiency of the process.

The nitric oxide used in the process of this invention should be of a high degree of purity. That is, it should not contain any sensible amounts of other oxides of nitrogen in order to avoid complicating side reactions, which operate to decrease the yield of desired nitroolefin.

The process has been illustrated with cyclohexene and styrene. It is to be understood, however, that it is applicable to the nitrosation of any olefin hydrocarbon containing more than two carbon atoms. Examples of olefin hydrocarbons, in addition to those of the examples, are propylene, butylene, octenes, dodecenes, octadecenes, methyl cyclohexene α-methyl styrene, butadiene, and isoprene. The monoolefin hydrocarbons are preferred because they readily nitrosate with minimum of complicating side reaction product formation.

The process of this invention makes nitroolefins readily accessible. These compounds are attractive intermediates for amines, aminoalcohols, ethers, thioethers, and the like.

I intend to be limited only by the following patent claims:

I claim:

1. The process for the preparation of a nitroolefin which comprises reacting with nitric oxide an olefin containing more than two carbon atoms, said reaction being conducted in an acid medium in the absence of air at temperatures from 80 to 150° C. and under pressure of 50 to 400 pounds per square inch.

2. The process for the preparation of a nitroolefin which comprises reacting with nitric oxide an olefin containing more than two carbon atoms, said reaction being conducted in the presence of a saturated aliphatic carboxylic acid anhydride in the absence of air at temperatures from 80 to 150° C. and under pressure of 50 to 400 pounds per square inch.

3. The process of claim 1 wherein the olefin is selected from the group consisting of propylene, butylene, octenes, dodecenes, octadecenes, cyclohexene, methyl cyclohexene, styrene, α-methyl styrene, butadiene and isoprene.

4. The process for the preparation of a nitroolefin which comprises reacting with nitric oxide an olefin containing more than two carbon atoms, said reaction being conducted in an acid medium in the absence of air at temperatures from 90 to 125° C. and under pressure of 50 to 400 pounds per square inch.

5. The process for the manufacture of 1-nitrocyclohexene which comprises reacting cyclohexene and nitric oxide in the presence of acetic anhydride, in the absence of air, at temperatures between 90 and 125° C., and at a pressure from 50 to 400 pounds per square inch.

6. The process for the preparation of 1-nitrocyclohexene which comprises reacting cyclohexene and nitric oxide in the presence of acetic acid in the absence of air at temperatures between 90 and 125° C. and at pressures from 50 to 400 pounds per square inch.

7. The process for the preparation of omega-nitrostyrene which comprises reacting styrene and nitric oxide in the presence of acetic anhydride, in the absence of air, at temperatures between 90 and 125° C. and at a pressure from 50 to 400 pounds per square inch.

RICHARD EDWARD BENSON.

References Cited in the file of this patent

UNITED STATES PATENTS

| Number | Name | Date |
|---|---|---|
| 2,314,615 | Franklin et al. | Mar. 23, 1943 |
| 2,542,985 | Bond | Feb. 27, 1951 |

OTHER REFERENCES

Groggins, "Unit Processes in Organic Synthesis," page 1, Final edition (1947), McGraw-Hill Book Co., Inc.